No. 818,426. PATENTED APR. 24, 1906.
W. N. FOUST.
NOODLE CUTTER.
APPLICATION FILED SEPT. 9, 1904.

Witnesses

Inventor
William N. Foust
Attorney

UNITED STATES PATENT OFFICE.

WILLIAM N. FOUST, OF SUMMIT TOWNSHIP, CRAWFORD COUNTY, PENNSYLVANIA.

NOODLE-CUTTER.

No. 818,426.	Specification of Letters Patent.	Patented April 24, 1906.

Application filed September 9, 1904. Serial No. 223,940.

*To all whom it may concern:*

Be it known that I, WILLIAM N. FOUST, a citizen of the United States, residing in the township of Summit, in the county of Crawford and State of Pennsylvania, have invented certain new and useful Improvements in Noodle-Cutters, of which the following is a specification.

My invention relates to devices for cutting dough into strips for noodles, and has for its object the provision of a device having a number of cutting-disks journaled in slits in a suitable handle, the parts of the handle between said slits being shaped so as to provide free cutting-surfaces for the disks, while the surface of said parts curve out beyond the edges of the disks to form a comb to separate the stripped dough from the disks and prevent it from following the disk edges in their rotation.

The construction and advantages of my invention will be explained in detail hereinafter and illustrated on the accompanying drawings, in which—

Figure 1:
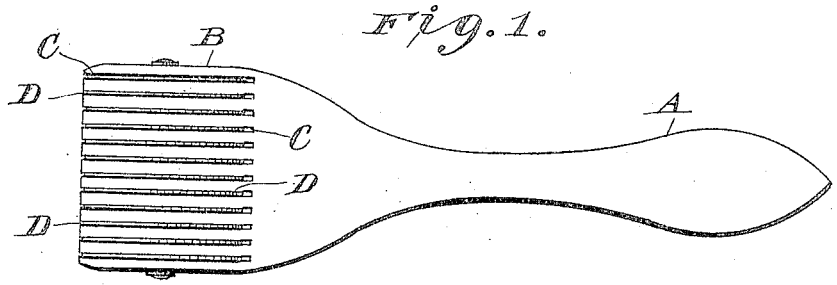
Figure 2:
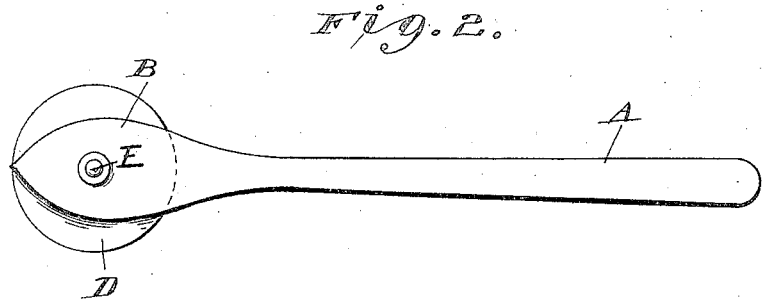
Figure 3:

Figure 1 is a top plan view of my improved noodle-cutter; Fig. 2, a side view, and Fig. 3 a view of the handle with the disks removed.

In the drawings similar reference characters indicate corresponding parts throughout the several views.

My invention consists of a handle or grip portion A and a wider portion B, having parallel slits C therein, in which are mounted disk-cutters D, journaled on a shaft E, extending through said portion B. The parts of portion B between the slits C and outside of the outer slits is formed so as to expose the cutting edges of the disks D on either side of portion B and then curved outwardly to a point beyond the outer edges of the disks, this construction forming a comb to clean the strips of dough from the disks.

Having thus described my invention, what I claim is—

A rotary disk-cutter comprising a handle having a widened portion at one end thereof, the upper and lower surfaces of said widened portion being curved to an edge, parallel slits in said widened portion at right angles to said curved surfaces, cutting-disks mounted in said slits, and a rod passed through said wide portion and centrally through said disks and in such a position that the edges of said disks project beyond said upper and lower curved surfaces, substantially as shown and described.

In testimony whereof I hereto affix my signature in the presence of two witnesses.

WILLIAM N. FOUST

Witnesses:
C. M. KYLE,
O. CLARE KENT.